US008521841B2

(12) United States Patent
Warren (10) Patent No.: US 8,521,841 B2
(45) Date of Patent: Aug. 27, 2013

(54) EFFICIENT DELIVERY OF CROSS-LINKED REPORTS WITH OR WITHOUT LIVE ACCESS TO A SOURCE DATA REPOSITORY

(75) Inventor: William R. Warren, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1107 days.

(21) Appl. No.: 11/871,030

(22) Filed: Oct. 11, 2007

(65) Prior Publication Data
US 2009/0099999 A1 Apr. 16, 2009

(51) Int. Cl.
*G06F 17/30* (2006.01)

(52) U.S. Cl.
USPC ............ 709/219; 707/705; 709/203

(58) Field of Classification Search
USPC ................ 709/203, 219; 707/705
See application file for complete search history.

(56) References Cited

U.S. PATENT DOCUMENTS

| | | | |
|---|---|---|---|
| 6,199,058 B1 * | 3/2001 | Wong et al. .................. 707/663 |
| 6,408,360 B1 * | 6/2002 | Chamberlain et al. ........ 711/124 |
| 6,606,525 B1 * | 8/2003 | Muthuswamy et al. ........ 700/52 |
| 6,934,717 B1 * | 8/2005 | James ................................ 1/1 |
| 7,051,038 B1 | 5/2006 | Yeh et al. |
| 7,130,812 B1 | 10/2006 | Iyer et al. |
| 2003/0120752 A1 * | 6/2003 | Corcoran ..................... 709/219 |
| 2004/0123236 A1 * | 6/2004 | Cheung ........................ 715/513 |
| 2004/0267702 A1 * | 12/2004 | Gallant et al. .................. 707/2 |
| 2007/0198687 A1 * | 8/2007 | Kasriel et al. ................ 709/223 |
| 2008/0104198 A1 * | 5/2008 | Kamath et al. ................ 709/217 |

FOREIGN PATENT DOCUMENTS

WO WO 02/54258 * 7/2002

OTHER PUBLICATIONS

Article entitled "Silk Central 2006 Release 2", dated Jan. 2007 by Borland.*
Article entitled "BIRT: BIRT Report Scheduling without Apache Tomcat", dated Jul. 11, 2006 by Ward.*
Article entitled "Generating Open for Business Reports with the BIRT RCP Designer" by Torres et al. on 2006.*
Michel et al., Discovering and Exploiting Keyword and Attribute-Value Co-occurrences to Improve P2P Routing Indices, CIKM 2006, ACM, Arlington, VA.
SHIRLEYSW, Create Drill-Through Reports using ReportViewer in ASP.NET 2.0, http://codeproject.com/aspnet/DrillThroughReport.asp, Dec. 2006.
SHIRLEYSW, Using the ASP.NET 2.0 ReportViewer in Local Mode, http://www.codeproject.com/aspnet/ReportViewer.asp, Sep. 2006.

* cited by examiner

*Primary Examiner* — Mahesh Dwivedi
(74) *Attorney, Agent, or Firm* — Cantor Colburn LLP; Feb Cabrasawan (57) ABSTRACT

Reports of data elements from a data repository, such as may be used in a browser based business information system, can be displayed whether or not the data repository is currently accessible. Report documents, comprising a master report as well as linked reports, may be exported to a local storage. Upon invoking a master report that has been previously exported to the local storage, requests for the data elements in parameter form that are ordinarily directed to the data repository are intercepted and the local storage is checked for copies of the previously exported reports. Any existing copies of the desired reports are presented as a first option. A browser applet may be used to intercept the data requests and convert them to the corresponding subdirectory paths on the local storage. The linked reports may also be exported to the local storage as a group in a batch operation.

18 Claims, 6 Drawing Sheets

EFFICIENT DELIVERY OF CROSS-LINKED REPORTS WITH OR WITHOUT LIVE ACCESS TO A SOURCE DATA REPOSITORY

BACKGROUND OF THE INVENTION

1. Field of the Invention

This invention relates to the creation and delivery of report data from a remote data repository. Particularly, this invention relates to making report data available in the event access to the source data repository is unavailable.

2. Description of the Related Art

A remote data repository may be utilized in many different systems to allow multiple users from connected computers to access a central data source. Accessed data may be formatted as it is delivered to the users based upon request parameters. For example, a web based system may deliver a report of data presented in a webpage that may be formatted according to instructions within the link to the data repository that retrieves the particular data. One such application is the Eclipse Foundation's Business Intelligence and Reporting Tools (BIRT) application.

BIRT is an Eclipse-based open source reporting system for web applications, particularly those based on Java and J2EE. BIRT employs two primary components, a report designer and a runtime component that can be added to an application server. BIRT also includes a charting engine that can be used to add charts to applications.

BIRT allows users to add a variety of report formats to their web applications such as lists, charts, crosstabs, letters & documents, and compound reports. Lists represent the simplest type of report format for data allowed by BIRT. Longer lists can employ grouping to organize related data together. For example, data of orders may be grouped by customer, or products grouped by supplier. If the data is numeric, totals, averages and other summaries may also be incorporated. Charts are another type of report format allowed by BIRT. Numeric data may be easier to interpret when presented as a chart. BIRT allows chart report formats such as pie charts, line & bar charts and others. Such charts may be rendered in SVG and support events to allow user interaction. Crosstabs are yet another type of report format allowed by BIRT. Crosstabs (also referred to as a cross-tabulation or matrix) present data in two dimensions. For example, sales per quarter or hits per web page may be easily represented in a crosstab report format. Letters and Documents are still another type of report format used by BIRT. Notices, form letters, and other textual documents may also be presented with BIRT. Such documents may include text, formatting, lists, and charts as well. Finally, BIRT also allows compound report formats. In many cases, it may be desirable to develop a report that combines one or more of the foregoing report formats into a single document. For example, a customer statement may list the information for the customer, provide text about current promotions, and provide columned lists of payments and charges. Also, a financial report may include disclaimers, charts, and tables. BIRT facilitates a report format allowing the combination of any two or more of the foregoing report formats.

Data for BIRT can be provided from networked databases (local or Internet, including VPN networks), web services, Java objects to a BIRT report. In addition, BIRT can provide JDBC, XML, Web Services, and Flat File support, as well as support for using code to get at other sources of data. Using the Open Data Access (ODA) framework, BIRT allows a user to build a new user interface and runtime support for any type of tabular data. Further, a single report can include data from any number of data sources. BIRT also supplies a feature that allows different data sources to be combined using inner and outer joins. Inner and outer joins refers to the intersection of data from different sources. "Inner joins" refers to a report from multiple tables of cross referenced data that does not reveal any missing cross references. For example, a database table of employees and a database table of departments. A report of information about each employee, might list several items about the employee's department. If an employee exists who has not yet been assigned a department, that employee would be missing from the report. Analogously, a report may group employees by department such that a department with no employees would be missing from the report. In contrast, a report performing an "outer join" would find all rows of the employee table (even if they do not have a department number) and all departments (even those with no employees). (The report might identify "not available" for the department information columns of such an employee, and would show the department number of an empty department, with no employees listed under it.)

A typical report in BIRT comprises four main parts, data, data transforms, business logic and presentation. Reports present formatted data sorted, summarized, filtered and grouped according to the user needs such that the data may undergo a data transform. Although databases can perform some of this work, BIRT can do this for simple data sources such as flat files or Java objects. BIRT allows sophisticated data transform operations such as grouping on sums and percentages of overall totals. BIRT can also employ business logic in its operation. Real-world data is seldom structured exactly as desired for a report. Many reports require business-specific logic to convert raw data into information useful for the user. If the logic is just for the report, it can be scripted using JavaScript support provided by BIRT. If the application already contains the logic, it can be called into the existing Java code. Finally, BIRT provides presentation capabilities. Once the data is ready, BIRT offers a range of options for presenting it to the user including tables, charts, and text, as previously mentioned. A single data set can appear in multiple ways, and a single report can present data from multiple data sets.

In addition to BIRT, some other data management and presentation tools have also been developed. Such tools operate to deliver reports of data to different user located remotely from the data repository.

U.S. Pat. No. 7,130,812 by Iyer et al., issued on Oct. 31, 2006, discloses a system and method for information management is provided. The system provides for collection of data from multiple, dissimilar and disparate sources having various collection schedules by a plurality of data collectors. It further provides a central database for storage of the collected data with front-end alerts and triggers. The central database has a central data store module for data storage and a central configuration module for configuring the data as well as the components of the system. The system includes a reporting module for generating and forwarding user specific scheduled reports from the accessed data in the central database. The presentation of the data could be any time, anywhere and in any format required by the end user. The system also provides an administration module for collecting, monitoring and configuring the collected data, data collectors, central database and the reports for the end users.

U.S. Pat. No. 7,051,038 by Yeh et al., published on May 23, 2006, discloses a system and method for a reporting information service using metadata to communicate with databases and a user interface. The invention includes software in a data access component, a report component, and a user interface component for populating, maintaining, and dispatching reports responsive to user requests for the reports via metadata. The data access component provides a logical view of data in a database via data access metadata. The report component populates, maintains, and dispatches reports via report metadata characterizing the reports. The user interface component renders the report dispatched from the report component via user interface metadata specifying rendering attributes for the report.

Existing systems and methods do not teach convenient techniques that can adjust to situations where the data repository may be inaccessible. Particularly, there is a need for techniques that allows a user to seamlessly review a previously generated report even though the data repository is currently unavailable. In addition, there is a need for such systems and method to make the saved reports accessible in user situations where no HTTP server and none of the reporting application software are available. These and other needs are met by the present invention as detailed hereafter.

SUMMARY OF THE INVENTION

An exemplary implementation of an embodiment of the invention may use a reporting program such as Eclipse Foundation's Business Intelligence and Reporting Tools (BIRT). The typical configuration of a tool such as BIRT requires the availability of an HTTP server. By default, the reporting tool generates the drill-down links using HTTP parameters. However, embodiments of the invention generate a master report and a selected set of the linked (or "drilled-down") reports available for offline viewing. Thus, an accessible HTTP server is not required as is normally needed to process the HTTP parameter input.

Reports of data elements from a data repository, such as may be used in a browser based business information system, can be displayed whether or not the data repository is currently accessible. Report documents, comprising a master report as well as linked reports, may be exported to a local storage. Upon invoking a master report that has been previously exported to the local storage, requests for the data elements in parameter form that are ordinarily directed to the data repository are intercepted and the local storage is checked for copies of the previously exported reports. Any existing copies of the desired reports are presented as a first option. A browser applet may be used to intercept the data requests and convert them to the corresponding subdirectory paths on the local storage. The linked reports may also be exported to the local storage as a group in a batch operation.

A typical embodiment of the invention comprises a computer program embodied on a computer readable medium including program instructions for loading a master report form comprising one or more master data element requests in parameter form that are directed to a data repository to retrieve corresponding one or more master data elements, program instructions for intercepting the one or more parameter form requests of the one or more master data elements directed to the data repository and checking for a previous master report copy on a local storage generated from the master report form, program instructions for displaying the previous master report copy from the local storage in response to finding the previous master report copy on the local storage, and program instructions for allowing the one or more master data element requests in the parameter form to be directed to the data repository to retrieve and display the corresponding one or more master data elements in a master report generated from the master report form in response to not finding the previous master report copy on the local storage. Checking for the previous master report copy may be performed in a master report subdirectory named for the master report on the local storage. Some embodiments may include program instructions for creating the master report subdirectory and saving a copy of the displayed master report in the master report subdirectory on the local storage.

In further embodiments, the one or more master data elements of the master report may each comprise a parameter form link to the data repository to display a linked report comprising one or more linked data elements from the data repository in response to the parameter form link being selected. These embodiments may include program instructions for intercepting any selected parameter form link to the data repository and checking for a previous linked report copy on the local storage generated from the selected parameter form link, program instructions for displaying the previous linked report copy from the local storage in response to finding the previous linked report copy on the local storage, and program instructions for allowing the parameter form link to be directed to the data repository to retrieve and display the corresponding one or more linked data elements in the linked report in response to not finding the previous linked report copy on the local storage. Furthermore, checking for the previous linked report copy may be performed in a linked report subdirectory named for the selected parameter form link on the local storage, the linked report subdirectory being under a master report subdirectory named for the master report on the local storage. Some embodiments may also include program instructions for creating the linked report subdirectory and saving a copy of the linked report in the linked report subdirectory on the local storage. Creating the linked report subdirectory and saving the copy of the linked report in the linked report subdirectory on the local storage may be performed in a batch operation for each parameter form link of the master report.

In some embodiments, any generated reports are generated on a local computer system that displays the reports. In addition, any of the reports (e.g., the master report or any linked report) may be displayed using a browser and the data repository remotely located and connected over a network.

Similarly, a typical method embodiment of the invention comprises the steps of loading a master report form comprising one or more master data element requests in parameter form that are directed to a data repository to retrieve corresponding one or more master data elements, intercepting the one or more parameter form requests of the one or more master data elements directed to the data repository, checking for a previous master report copy on a local storage generated from the master report form, displaying the previous master report copy from the local storage in response to finding the previous master report copy on the local storage, and allowing the one or more master data element requests in the parameter form to be directed to the data repository to retrieve and display the corresponding one or more master data elements in a master report generated from the master report form in response to not finding the previous master report copy on the local storage. Method embodiments of the invention may be further modified consistent with the program and system embodiments described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Embodiments of the invention are directed to data reporting systems, such as web-based tools, capable of delivering reports for viewing, based on data from a repository. The delivery format allows for powerful formatting and extended content. Example data formats that can be supported include Hypertext Mark-up Language (HTML) and Portable Document Format (PDF). In addition, data in one report may reference (i.e., be linked to) another report. For example, a data item in a first report may include a link to a second report with more detail on the data item (i.e., a so-called "drill-down" link).

Web-based tools such as BIRT use reports that often comprise drilled-down links to more detailed reports. Such links may typically be of an encoded form such as: service/reports?report=Order_Details&orderNumber=10100. In ordinary use, BIRT requires the availability of an HTTP server. By default, BIRT generates the drill-down links using HTTP parameter input (e.g., "?report=Order_Details&orderNumber=10100" in the foregoing example). It should be noted that embodiments of the invention are not limited to the BIRT tool, but may be applied to any reporting tool employing similarly linked reports to a remote data repository as will be understood by those skilled in the art. An exemplary embodiment of the invention can allow for at least three viewing use cases.

First, a selected report may be viewed generated on-demand, in a tabbed pane within a window of an installed-client Graphical User Interface (GUI). In addition to initially selecting from a list of available report definitions, the user may specify parameters to tailor the content of this initial report. Once viewing the report, the user may click on a hyper-linked data item to view a linked report. The linked report will be shown in a new tabbed pane. The linked report will have fixed parameter definitions. That is, the user will not get to choose parameters of the linked report. The linked report may, in turn, include hyper-linked data items. The user may click these to request further levels of linked reports.

Second, an embodiment of the invention allows viewing of reports while not connected to the data repository. These are reports that were previously viewed as described in the first case, above. This is accomplished as a result of an "export" action made available to the user in the first use case. The export action allows the user to save an individual report that they are viewing. It may also allow the user to save the original report and all the linked reports that have been viewed. If the operating system environment provides tools for viewing the reports in the selected format, then the reports may be stored in a manner that allows those tools to be used. For example, if the format is HTML, the reports should be directly viewable from the file system, by an included Web Browser, without requiring access to any server. In particular, embodiments of the invention allow the link reports to operate in a server-less environment.

Third, an embodiment of the invention can also allow requesting batch generation of a complete hierarchy of reports. The batch reports may be generated in the same manner as the export action described in the second use case above. The batch reports will include all possible reports that can be reached by the links from the foundational report. The resulting batch reports may then be viewed in the same manner as described in the second use case. Such batch generation allows for off-line viewing of all the linked reports whether or not they were previously viewed by the user.

In a typical prior art system, implementation of the links is conventionally performed using a uniform resource locator (URL) that locates the generator of reports. Suffixed to that URL will be specifications of all the parameters required to identify and generate the specific report. This presents a problem in that links with these parameter specifications will fail in the second and third use cases above. The conventional Web Browser, for example, cannot handle such parameters.

An additional issue with a typical prior art system arises because a Web server (HTTP server) is expected within the usual environments in which the report generation is performed and the report generation is run on that server remote from the installed-client GUI. In the first use case, this introduces unnecessary complexity and overhead in the processing path. Embodiments of the invention can eliminate the Web server from the first use case viewer environment by running the report generation directly under the installed-client GUI instead. As such, the report is generated in a local mode and additionally stored locally as described herein.

To enable full functionality in the server-less scenario, each parameter in the URL can be replaced by a pair of subdirectory specifications in the URL's path. The first subdirectory will be the key. The second subdirectory will be the value of the parameter. The URL, as a whole, will be a relative-path URL, so that the links will not have any absolute location dependency.

In the viewer environment of the first use case, the link URL requests can be intercepted before they would be sent to a Web server. The intercepting logic can handle URLs with the path specification substituted for the parameter specification. In this way, the same report file will operate for all use cases. For example, if the viewer caches reports, then, in the export action of the second use case, the reports can be directly copied from the cache to the export location (each at the relative path required by the URL that links to it).

Figure 1:
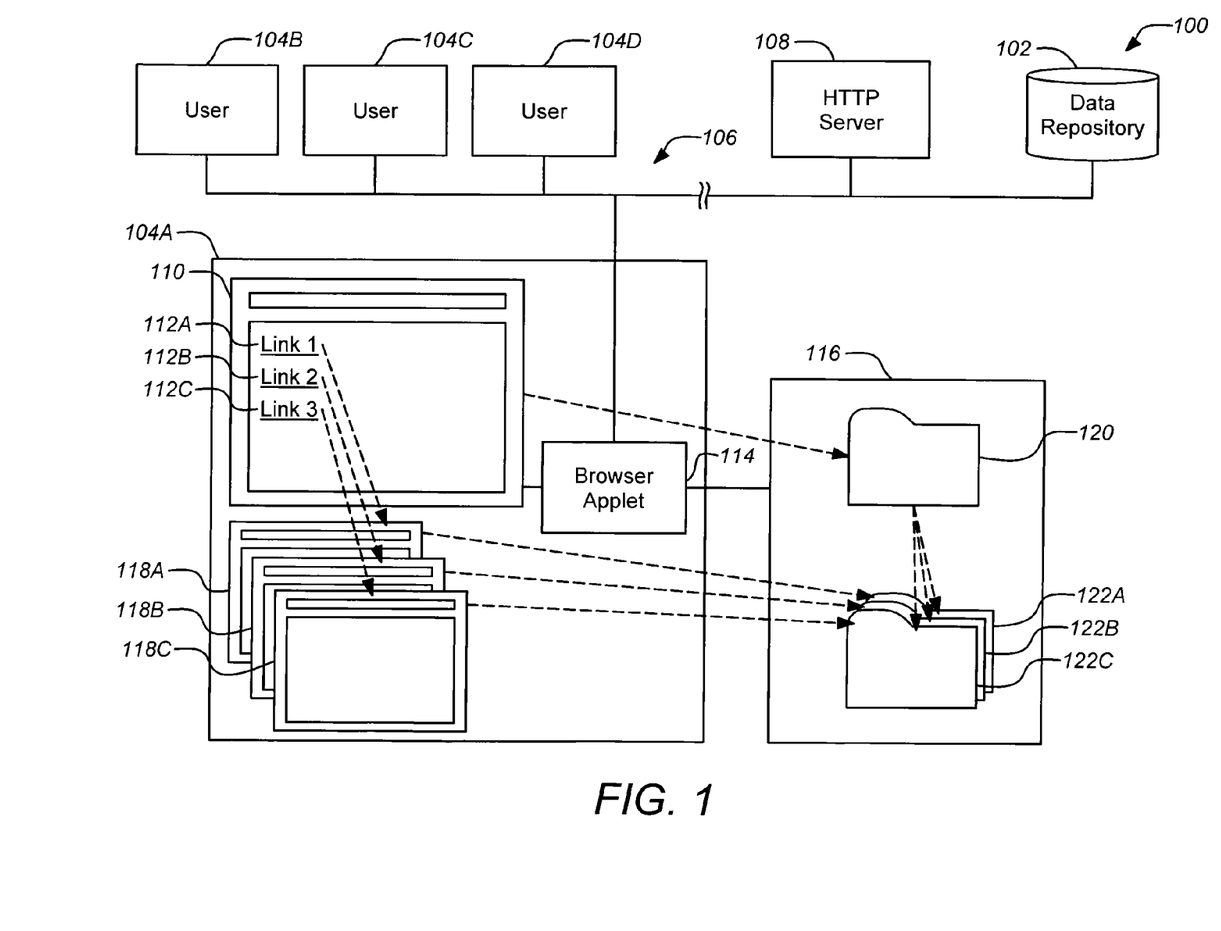
FIG. 1 illustrates an exemplary embodiment of the invention for delivering reports with or without live access to a source data repository.

FIG. 1 illustrates an exemplary embodiment of the invention for delivering reports with or without live access to a source data repository. The distributed computer system 100 comprises a data repository 102 which stores the report data to be delivered to the one or more user computers 104A-104D on a network 106. The network 106 may be a local network or a wide area network (e.g., web-based over the Internet). In one example, the network may operate as a secure virtual private network (VPN) over the Internet. A web server 108 (e.g., an HTTP server) may also be coupled to both the user computers 104A-104D on the network 106 as some applications may use an HTTP protocol in accessing a data repository. However, it should be noted that data repositories typically provide access using protocols optimized to their needs, such as the protocols used by the ODBC and JDBC interfaces, for application software to access relational databases, e.g. such as a reporting application.

In operation, a user computer 104A begins by loading and displaying a first report 110. As previously mentioned, the reports are displayed in a window of client GUI, such as a web browser or viewer application. The first report 110 may be loaded to the computer 104A from the remote server 108 or from a local storage 104 or from any other connected device. In any case, the top level report 110 is generated on the local computer system 104A rather than on the server 108. The generated report 110 includes one or more requests for one or more data elements 112A-112C that are specified in a parameter format within the report 110. The parameter format includes identification of the location of the remote data repository 102 as well as identification of the particular required data (e.g., completed sales orders for a specified client). Typically, the data repository 102 is employed as a collecting location for data to be compiled from multiple sources or that may be altered by multiple user computers. For example, sales orders and other client information for a business may be compiled in a database on the repository 102 that can be retrieved an alternately sorted through the use of customized reports in a web-base system such as BIRT.

Embodiments of the invention can be implemented through a browser applet 114 (or widget) that monitors and intercepts accesses to the data repository 102 as a report 110 is generated to be displayed. The first time that the particular report 110 is displayed on the particular user computer 104A, data that is applied in the report 110 must be drawn from the remote data repository 102. In addition, the displayed data elements 112A-112C within the top level report 110 may also each comprise a drill down link specifying one or more data items for a lower level reports 118A-118C to be originally retrieved from the data repository 102. Upon initiation of an export operation by the user, the browser applet 114 automatically creates document files and a directory structure based on the parameter formatted data element requests for the top level report 110 and any lower level reports 118A-118C on a local storage 116 of the computer system 104. The data for the lower level reports 118A-118C may be retrieved from the data repository even though the lower level reports are not currently being displayed as the export operation may be performed in a batch mode. For example, a top level subdirectory 120 is created to hold one or more document files comprising the data element content of the top level report as well as a lower level subdirectory 122A-122C for each lower level report 118A-118C that will each contain one or more document comprising the data element content of their respective lower level report 118A-118C. When the same top level report 110 is again requested at a later time, the browser applet will recognize that a copy of the report 110 exists on the local storage 116 and display that first. Thus, it is unnecessary at this stage to have access to the data repository 102. Further details and examples for implementing an embodiment of the invention will be described in the following sections.

2. Hardware Environment

Figure 2:
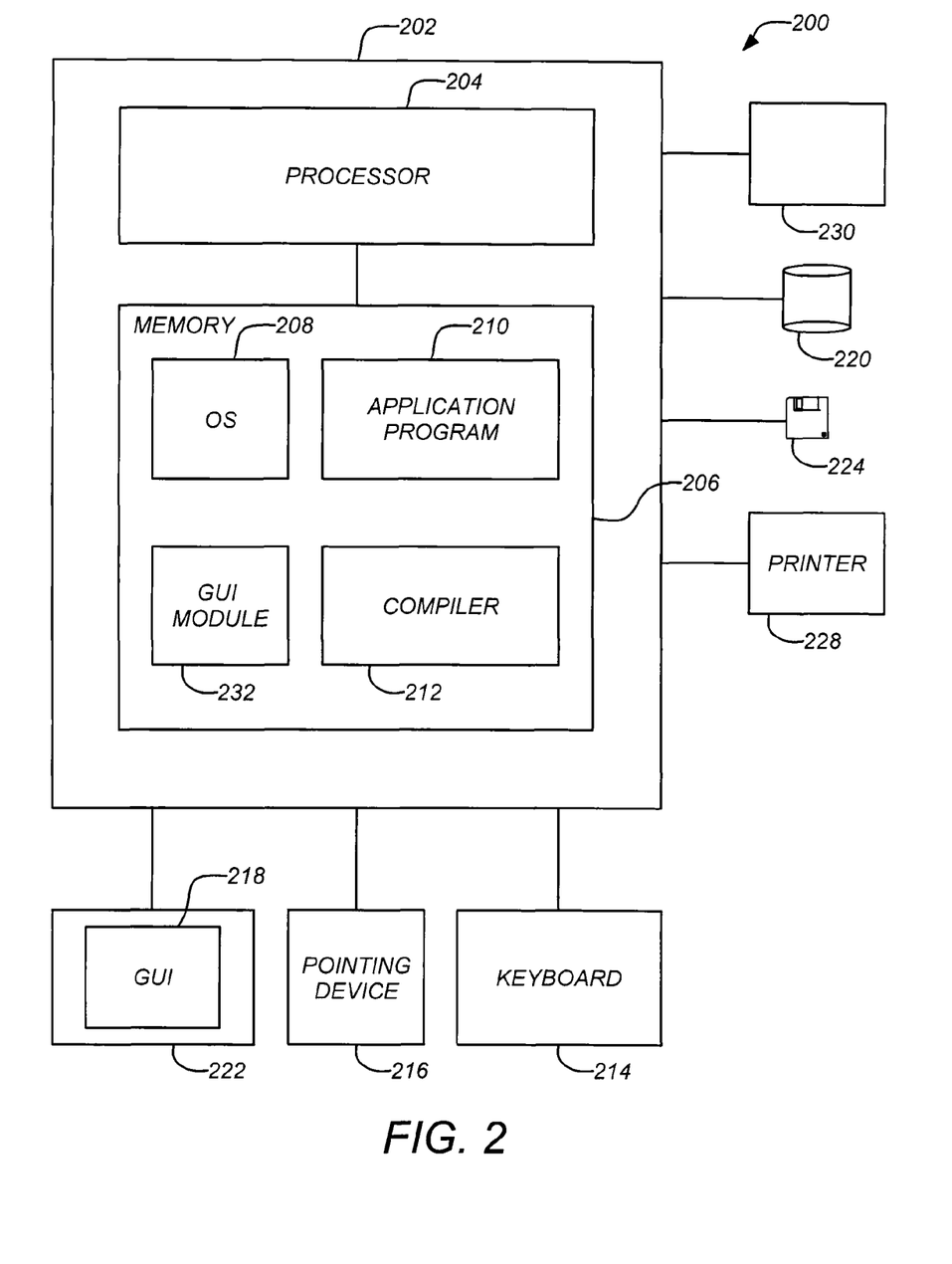
FIG. 2 illustrates an exemplary computer system 200 that can be used to implement embodiments of the present invention.

FIG. 2 illustrates an exemplary computer system 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer 228, etc. Of course, those skilled in the art will recognize that any combination of the above components, or any number of different components, peripherals, and other devices, may be used with the computer 202.

Generally, the computer 202 operates under control of an operating system 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. Although the GUI module 232 is depicted as a separate module, the instructions performing the GUI functions can be resident or distributed in the operating system 208, a computer program 210, or implemented with special purpose memory and processors.

The computer 202 also implements a compiler 212 which allows one or more application programs 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic generated using the compiler 212. The computer 202 also optionally comprises an external data communication device 230 such as a modem, satellite link, ethernet card, wireless link or other device for communicating with other computers, e.g. via the Internet or other network.

Instructions implementing the operating system 208, the computer program 210, and the compiler 212 may be tangibly embodied in a computer-readable medium, e.g., data storage device 220, which may include one or more fixed or removable data storage devices, such as a zip drive, floppy disc 224, hard drive, DVD/CD-ROM, digital tape, etc., which are generically represented as the floppy disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention are generally directed to a software application program 210 for delivering reports of data to users from a remote data repository such as described in the system 100 of FIG. 1. Typically, embodiments of the invention may be implemented in the context of a browser-based reporting systems operating over the Internet although the invention is not limited to such browser-based systems. The program 210 for delivering reports of data to users from a remote data repository (particularly the browser applet) may operate within a single computer 202 or as part of a distributed computer system comprising a network of computing and storage devices. For example, the system 100 may operate on the computer 258 which operates as a user computer that accesses the data repository through the HTTP server. The applicable data repository may encompass one or more computer devices and/or storage devices connected via a local area network and/or Internet connection (which may be public or secure, e.g. through a VPN connection) as illustrated in the exemplary distributed computer system 100 of FIG. 1.

Those skilled in the art will recognize many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

3. Report Delivery With or Without Live Access to the Data Repository

The previous sections describe a generalized implementation of an embodiment of the invention as well as a suitable hardware environment including a report delivery system from a remote data repository over which an embodiment of the invention can be implemented.

As previously mentioned, embodiments of the invention operate to seamlessly display reports that originated from a data repository whether or not the data repository is currently accessible (provided the report has been previously delivered and stored).

To enable full functionality although there is current access to the data repository through the server, each parameter in the URL link can be converted to a pair of subdirectory specifications in the URL's path, a path specification. For example, a top subdirectory (for all the linked reports) can be defined by the key of the parameter form request and one or more lower subdirectories for each linked report can be the value of the parameter form request. The URL, as a whole, can be a relative path URL, so that the links will not have any absolute location dependency as with the parameter form link directed to the data repository.

In the installed-client GUI viewer environment (e.g., browser) of first use case, the link URL requests may be intercepted before they are directed to a Web server, e.g. by the browser applet. The intercepting logic may handle URLs with the path specification substituted for the parameter specification. In this manner, the same report file can operate for all cases. For example, if the viewer typically caches reports, the report documents (the master report as well as any linked reports) can be directly copied from the cache to a storage location (e.g., a local storage device), each at the relative path required by the path specification in an export action of the second use case.

The installed-client GUI viewer of the first use case may be implemented with browser applet available in the GUI platform. The browser applet may capable of displaying HTML or PDF formatted documents or any other document type that is employed in the reporting system. Typically, the browser applet may provide a "location listener," which can notify the viewer when a new URL is requested (e.g., by a link). The location listener interface can provide an option that will allow the viewer's listener code to veto changing the location in the current browser. Instead, the viewer may launch another viewer instance in a new tabbed pane.

Figure 3A:
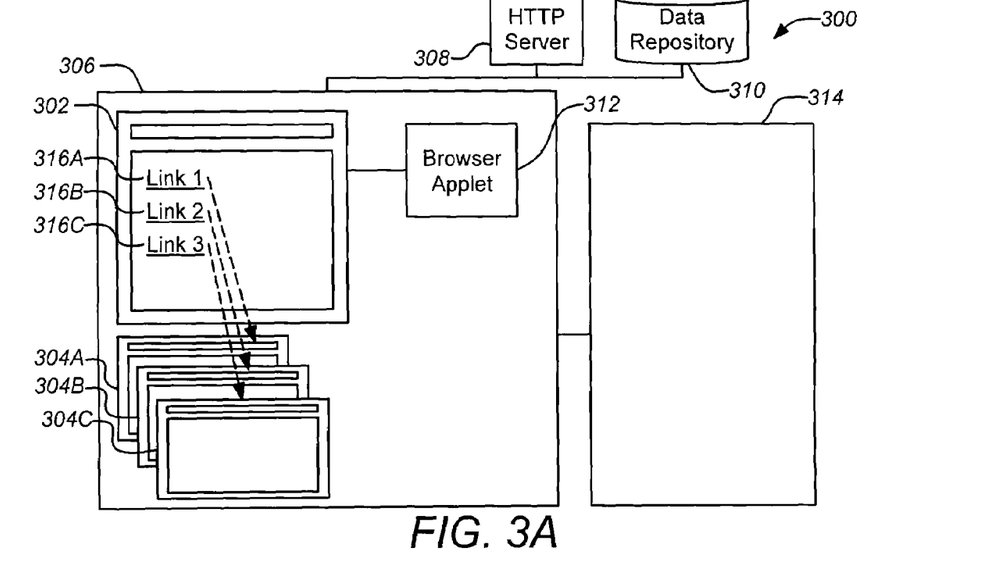
FIGS. 3A-3C illustrate three processes employed in the generating and displaying reports in accordance with an exemplary embodiment of the invention.
Figure 3B:
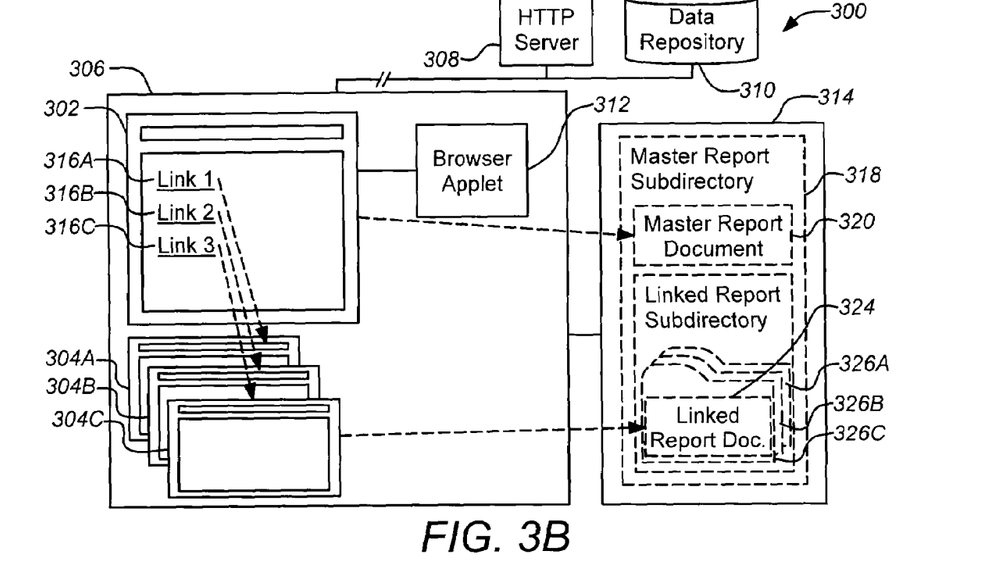
Figure 3C:
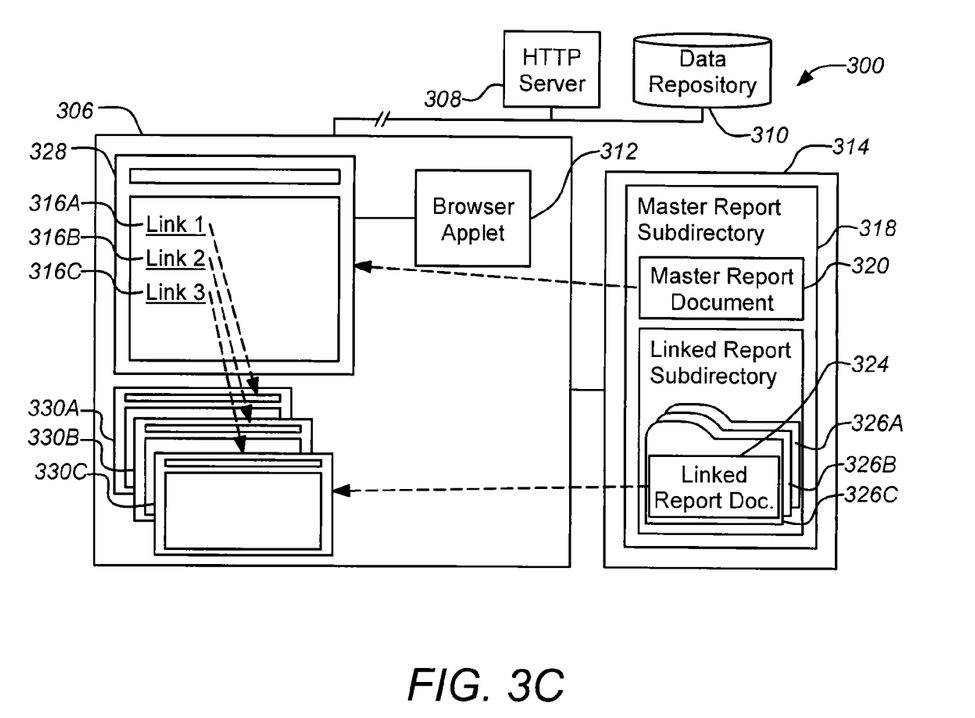

FIGS. 3A-3C illustrate three distinct processes employed in the generating and displaying reports in accordance with an embodiment of the invention. FIG. 3A illustrates the original process of generating and displaying a master report 302 and one or more linked reports 304A-304C on a user computer 306 in an example report system 300. The process begins by loading report form (which may be embodied in a document file such as a web page) that includes the report generation instructions. The form may be loaded from a local storage 314, a remote server 308 or any other location. The form may be defined as including hidden instructions (e.g. coding) that control the contents of the generated and displayed report as well as the displayed content presented to the user. The form includes the one or more data element requests in parameter form that are directed to the absolute location of the data repository 310. A browser applet 312 that operates with the report generation intercepts any data element requests from the report form to the data repository 310 and checks for a previously saved copy of the master report 302 on a local storage 314. If no copy is found on the local storage 314, the master report 302 must be generated using the data elements from the data repository in the usual manner. Accordingly, the browser applet 312 allows the parameter form data element requests to continue to the data repository 310. In this case, connection to the data repository 310 is required. As previously mentioned, the server 308 may optionally be used depending upon the protocol requirements of the particular application.

Generating the master report 302 is performed on the local system 306. The master data elements which are returned from the data repository 310 in response to the data element requests are formatted and displayed in the master report 302 within the viewer (browser). Each returned master data element may be presented in the displayed master report 302 as a link 316A-316C. For example, if the master report 302 is for sales orders, the text presented as "Link 1" may be the returned master data element, e.g. an order number. A separate linked report 304A-304C may be opened when each of the links 316A-316C is selected. Each of the links 316A-316C are in parameter form directed to the data repository 310 to similarly retrieve one or more specified linked data elements. Here also, the browser applet 312 may first intercept the parameter form link 316A-316C and first check whether a corresponding copy of a previously save linked report exists on the local storage 314. (This is presumptively not the case, if it has already been determined that there was no previously saved master report. Thus, it may be possible to dispense with checking for previously saved linked reports.) Each of the opened linked reports 304A-304C displays the returned one or more linked data elements.

FIG. 3B illustrates the process of saving or exporting a master report 302 and one or more linked reports 304A-304C on a user computer 306 in an example report system 300. The export process involves creating subdirectories on the local storage 314 organized according to a convention defined by the report and link names. (In this way, the browser applet 312 can automatically determine where to check for and report copies when the master report is loaded in the future before allowing the parameter form requests and links to proceed to the data repository 310.) The export process does not require access to the data repository 310 because report copies are only being saved on the local storage 314. For example, a master report subdirectory 318 may be created named for the master report name. A copy of the master report 302 is saved within this subdirectory 318 as one or more master report document files 320. Additionally, a linked report subdirectory 322 may be created within the master report subdirectory 318 to store copies of any linked reports 304A-304C that may exist. For example, a copy of each linked report 304A-304C may be saved as one or more linked report document files 324 within the linked report subdirectory 322. The linked report document files 324 may be stored within separate subdirectories 326A-326C, one for each linked report 304A-304C. The linked report subdirectory 322 may be named for the master report data element request, the "key" of the parameter form request that generates the linked reports. Each of the separate subdirectories 326A-326C under the linked report subdirectory 322 may then be named for the respective data element, the "value" within the master report 302 that is displayed.

In one example application, the master report 302 may be named "order lists" and includes parameter formatted requests of "order numbers" to the data repository 310. The master report subdirectory 318 may be named "orderlists" along with a similarly named master report document file 320, "Order_Lists.html" within the "orderlists" master report subdirectory 318. The linked report subdirectory 322 may be named "ordernumbers" and created within the master report subdirectory 318. Separate lower subdirectories 326A-326C may then be created within the linked report subdirectory 322, one for each linked report 304A-304C, named for the each order number that exists in the master report 302. Each of these lower subdirectories 326A-326C stores a corresponding linked report document file 324, which may be commonly named, e.g. "Order_Details.html", because they are stored in the different lower subdirectories 326A-326C. (Note that only one linked report document file 324 is shown in FIG. 3B). It should also be noted that the naming convention described here is only one example. Those skilled in the art will appreciate that many other conventions may be used to automatically generate the subdirectories structure. It is only necessary that the structure be developed automatically from the content of the master report and linked reports.

The export process may be invoked in a number of ways. In one example, the export process can be initiated by the user after loading a master report 302. Alternately, the export process may occur automatically after loading a master report 302 every time it is determined that a copy does not exist on the local storage 314. In addition, the export process may also save copies of the linked reports before they have been displayed. In this case the linked reports 304A-304C are generated but saved directly as linked report documents files 324 in the appropriate lower level subdirectories 326A-326C of the linked report subdirectory 322.

FIG. 3C illustrates the process of displaying a previously saved a master report copy 328 and one or more previously saved linked report copies 330A-330C on a user computer 306 in an example report system 300. This process is the consequence of finding previously saved of the master report document files 320 and linked report document files 324 (as described in FIG. 3B) after the browser applet 312 has intercepted data element requests in parameter form and checked for copies on the local storage 314 (as described in FIG. 3A). In this case, the parameter form data element requests and parameter form links are not allowed to be sent to the data repository 310 and the master report copy 328 and any selected linked report copies 330A-330C are loaded directly from the local storage 314. (The display master report copy 328 and any selected linked report copy 330C are the master report document file 320 and the example linked report document file 324, respectively.) Accordingly, there is no need for access to the data repository 310 as indicated by the broken link. Although such access is not required to load the previously saved report copies, access is required to update the report content if the data has changed, which may also prompt saving new copies of the reports overwriting the older document files, either manually or automatically.

An exemplary reporting system may be implemented using Eclipse technology (e.g. described at eclipse.org) as part of an Aperi open source storage management system as will be understood by one skilled in the art. The standard widget toolkit (SWT) portion of the Eclipse GUI platform provides an acceptable browser applet to implement an embodiment of the invention. In addition, BIRT, the open source project also hosted at eclipse.org, provides report design and generation tools. Particularly, the report generation facility is capable of being invoked in many contexts, including the installed-client GUI of the viewer, enabling generation of reports within the user computer system rather than on the server. The BIRT design facilities support construction of linked URL's of the required form.

Figure 4A:
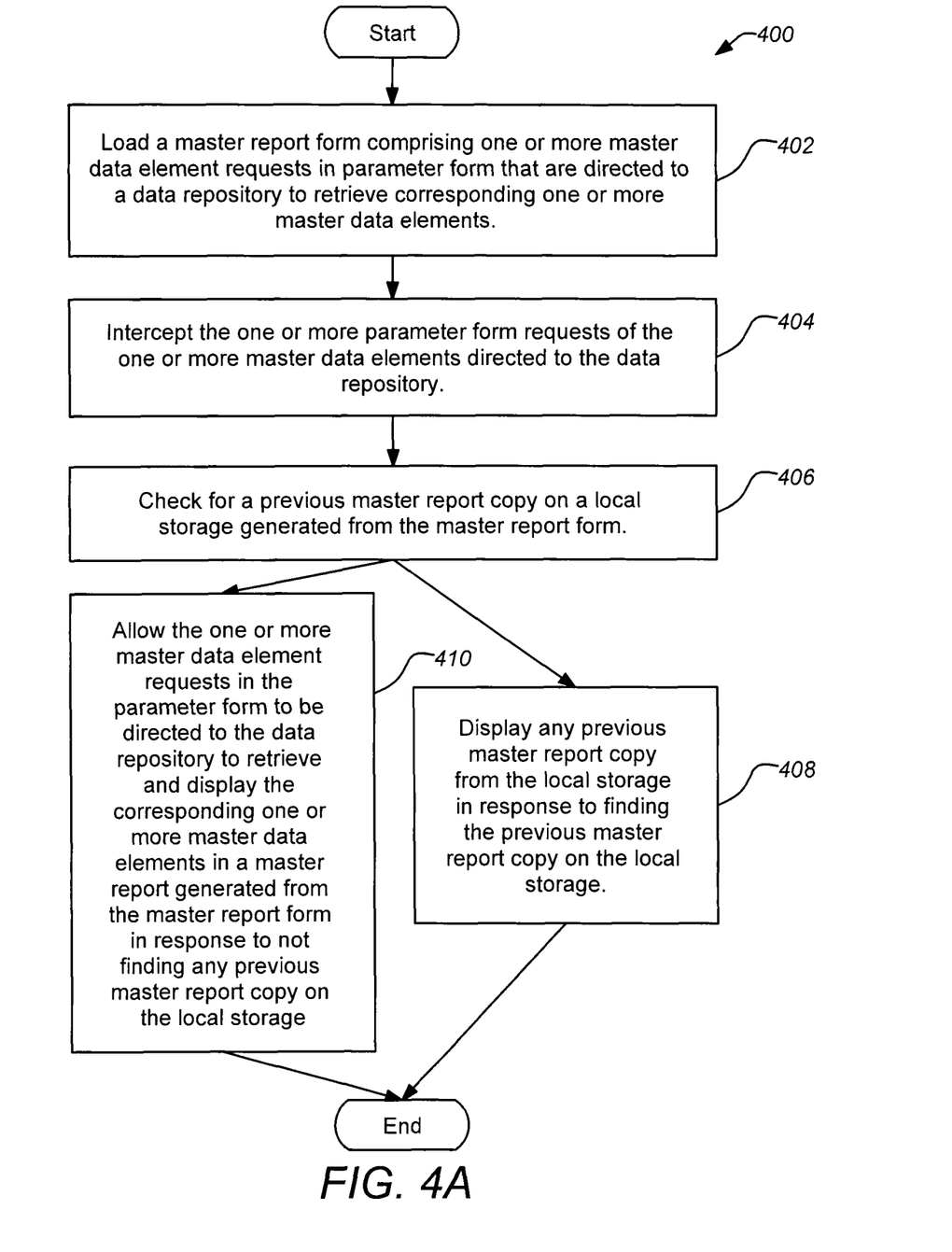
FIG. 4A is a flowchart of an exemplary method for displaying reports from a data repository.

FIG. 4A is a flowchart of an exemplary method 400 for displaying reports from a data repository. The method 400 begins with an operation 402 of loading a master report form comprising one or more master data element requests in parameter form that are directed to a data repository to retrieve corresponding one or more master data elements. Next in operation 404, the one or more parameter form requests of the one or more master data elements directed to the data repository are intercepted. Next in operation 406, the system checks for a previous master report copy on a local storage generated from the master report form. In operation 408, any previous master report copy from the local storage is displayed in response to finding the previous master report copy on the local storage. Alternately, in operation 410, the one or more master data element requests in the parameter form are allowed to be directed to the data repository to retrieve and display the corresponding one or more master data elements in a master report generated from the master report form in response to not finding any previous master report copy on the local storage. The method 400 may be further modified consistent with program or system embodiments described herein.

Figure 4B:
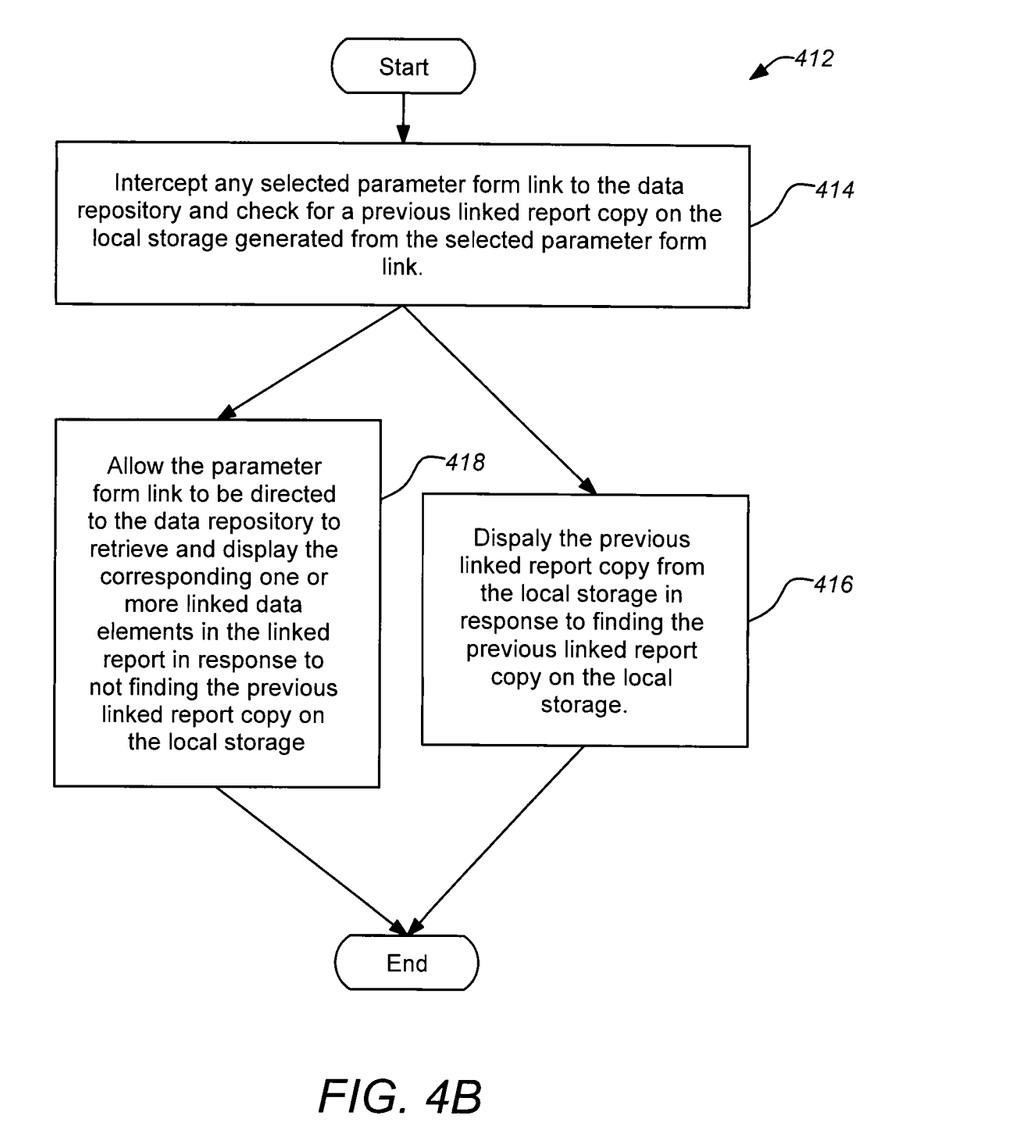
FIG. 4B is a flowchart of a supplementary sub-method of additional optional operations to manage displaying the linked reports appended to the exemplary method of FIG. 4A.

FIG. 4B is a flowchart of a supplementary sub-method 412 of additional optional operations to manage displaying the linked reports appended to the method 400. The method 400 may be operated where the one or more master data elements of the master report each comprise a parameter form link to the data repository to display a linked report comprising one or more linked data elements from the data repository in response to the parameter form link being selected. In operation 414, any selected parameter form link to the data repository is intercepted and a previous linked report copy is checked for on the local storage generated from the selected parameter form link. In operation 416, the previous linked report copy is displayed from the local storage in response to finding the previous linked report copy on the local storage. Alternately in operation 418, the parameter form link is allowed to be directed to the data repository to retrieve and display the corresponding one or more linked data elements in the linked report in response to not finding the previous linked report copy on the local storage.

Checking for the previous linked report copy may be performed in a linked report subdirectory named for the selected parameter form link on the local storage, the linked report subdirectory being under a master report subdirectory named for the master report on the local storage. Thus, the linked report subdirectory may be created and a copy of the linked report saved in the linked report subdirectory on the local storage, e.g. as part of an export process. In some embodiments, this export process may be performed in a batch operation for each parameter form link of the master report.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A computer program embodied on a data storage device, comprising:
   program instructions for loading a master report form comprising one or more dynamically generated master data element requests in parameter form that are directed to a data repository to retrieve corresponding one or more master data elements;

program instructions for loading one or more lower level reports, the one or more lower level reports comprising sub-reports of the master report and loaded automatically as a batch operation without being displayed or requested;

program instructions for intercepting the one or more parameter form requests of the one or more dynamically generated master data elements directed to the data repository and checking for a previous master report copy on a local storage comprising the one or more dynamically generated master data elements previously generated from the master report form;

program instructions for displaying the previous master report copy from the local storage in response to finding the previous master report copy on the local storage; and program instructions for allowing the one or more dynamically generated master data element requests in the parameter form to be directed to the data repository to retrieve and display the corresponding one or more dynamically generated master data elements in a master report generated from the master report form in response to not finding the previous master report copy on the local storage; wherein the one or more dynamically generated master data elements of the master report each comprise a parameter form link to the data repository to display a linked report comprising one or more linked data elements from the data repository in response to the parameter form link being selected.

2. The computer program of claim 1, wherein checking for the previous master report copy is performed in a master report subdirectory named for the master report on the local storage.

3. The computer program of claim 2, further comprising program instructions for creating the master report subdirectory and saving a copy of the displayed master report in the master report subdirectory on the local storage.

4. The computer program of claim 1, further comprising program instructions for intercepting any selected parameter form link to the data repository and checking for a previous linked report copy on the local storage generated from the selected parameter form link;

program instructions for displaying the previous linked report copy from the local storage in response to finding the previous linked report copy on the local storage; and program instructions for allowing the parameter form link to be directed to the data repository to retrieve and display the corresponding one or more linked data elements in the linked report in response to not finding the previous linked report copy on the local storage.

5. The computer program of claim 1, wherein checking for the previous linked report copy is performed in a linked report subdirectory named for the selected parameter form link on the local storage, the linked report subdirectory being under a master report subdirectory named for the master report on the local storage.

6. The computer program of claim 5, further comprising program instructions for creating the linked report subdirectory and saving a copy of the linked report in the linked report subdirectory on the local storage.

7. The computer program of claim 6, wherein creating the linked report subdirectory and saving the copy of the linked report in the linked report subdirectory on the local storage is performed in a batch operation for each parameter form link of the master report.

8. The computer program of claim 1, wherein any generated reports are generated on a local computer system that displays the reports.

9. The computer program of claim 1, wherein any reports are displayed using a browser and the data repository remotely located and connected over a network.

10. A method comprising the steps of:

loading a master report form comprising one or more dynamically generated master data element requests in parameter form that are directed to a data repository to retrieve corresponding one or more master data elements;

intercepting the one or more parameter form requests of the one or more dynamically generated master data elements directed to the data repository;

replacing each of the one or more parameter form requests with a pair of subdirectory specifications, the first subdirectory specification comprising a key, and the second subdirectory specification comprising a value of the parameter, wherein the one or more parameter form requests become one or more relative uniform resource locators (URLs);

checking for a previous master report copy on a local storage comprising the one or more dynamically generated master elements previously generated from the master report form;

displaying the previous master report copy from the local storage in response to finding the previous master report copy on the local storage; and allowing the one or more dynamically generated master data element requests in the parameter form to be directed to the data repository to retrieve and display the corresponding one or more dynamically generated master data elements in a master report generated from the master report form in response to not finding the previous master report copy on the local storage; wherein the one or more dynamically generated master data elements of the master report each comprise a parameter form link to the data repository to display a linked report comprising one or more linked data elements from the data repository in response to the parameter form link being selected.

11. The method of claim 10, wherein checking for the previous master report copy is performed in a master report subdirectory named for the master report on the local storage.

12. The method of claim 11, further comprising creating the master report subdirectory and saving a copy of the displayed master report in the master report subdirectory on the local storage.

13. The method of claim 10, further comprising intercepting any selected parameter form link to the data repository and checking for a previous linked report copy on the local storage generated from the selected parameter form link;

displaying the previous linked report copy from the local storage in response to finding the previous linked report copy on the local storage; and allowing the parameter form link to be directed to the data repository to retrieve and display the corresponding one or more linked data elements in the linked report in response to not finding the previous linked report copy on the local storage.

14. The method of claim 10, wherein checking for the previous linked report copy is performed in a linked report subdirectory named for the selected parameter form link on the local storage, the linked report subdirectory being under a master report subdirectory named for the master report on the local storage.

15. The method of claim 14, further comprising creating the linked report subdirectory and saving a copy of the linked report in the linked report subdirectory on the local storage.

16. The method of claim 15, wherein creating the linked report subdirectory and saving the copy of the linked report in the linked report subdirectory on the local storage is performed in a batch operation for each parameter form link of the master report.

17. The method of claim 10, wherein any generated reports are generated on a local computer system that displays the reports.

18. The method of claim 10, wherein any reports are displayed using a browser and the data repository remotely located and connected over a network.

* * * * *